United States Patent Office 3,475,539
Patented Oct. 28, 1969

---

3,475,539
2,2 - BIS(CHLOROMETHYL) - 1,3 - PROPANEDIOL CYCLIC SULFITE AS A BIRD MANAGEMENT AGENT
Andrew J. Reinert, Kenneth E. Cantrel, and Raymond L. Cobb, Bartlesville, Okla., assignors to Phillips Petroleum Company, a corporation of Delaware
No Drawing. Filed Jan. 2, 1968, Ser. No. 694,879
Int. Cl. A01n 9/12; A01m 29/00
U.S. Cl. 424—276                      9 Claims

ABSTRACT OF THE DISCLOSURE 2,2 - bis(chloromethyl) - 1,3-propanediol cyclic sulfide, when ingested by a limited number of a flock of pest birds, effects actions in the treated birds that disperse the flock from a locus.

---

Background of the invention

This invention relates to the control of birds and to bird management compositions.

The control of birds is one of the major problems confronting farms and city managers at this time. For instance, the loss of grain and seed by bird consumption represents considerable financial loss to farmers each year. Cities frequently spend may thousands of dollars in a year in an attempt to drive away birds and thus prevent the defacing of buildings and the like. Furthermore, there have been several airplane crashes attributed to flocks of birds circling in the landing pattern and near the ends of airport runways. Also, birds cause further difficulties by aiding in the transmission of various livestock diseases. Various means have been employed to scare or otherwise drive birds away from certain localities. For example, scare crows have been used for many years by farmers in grain fields or other areas, although this method has actually met with little success. More modern versions of the scarecrow, such as artificial owls, hawks, and the like have also met with little success. Certain types of noise makers such as sirens, exploding shell crackers, carbide cannons, recorded distress and alarm calls, and the like have also been used.

Since birds as a general rule do not like to roost on soft, greasy surfaces, various chemical substances which exhibit soft greasy characteristics have been employed as bird control agents by utilizing their physical characteristics. However, since these compositions may change in consistency in weathering, the use of chemical compositions in this manner can have serious shortcomings.

More recently chemical repellants have been developed which operate by causing a bird eating a small amount of the treated food to emit warning cries which disperse other birds from the area. This is disclosed by U.S. 3,113,072, 3,150,041, and 3,137,617 for instance. U.S. 3,193,455, discloses bait materials which have been successfully used to treat nuisance and depredatory birds which are difficult to control because of a reluctance to accept the usual baits.

Brief summary of the invention

It is an object of this invention to provide a method for clearing an area of birds. Another object of this invention is to provide a method of protecting property from birds. A further object of this invention is to provide novel bird management compositions.

In accordance with the present invention, the activity of birds can be controlled by subjecting birds to the action of an effective distress initiating amount of 2,2-bis(chloromethyl)-1,3-propanediol cyclic sulfite

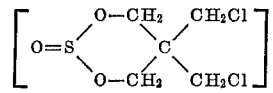

Description of the preferred embodiments

Materials which can be ingested by nuisance or depredatory birds are treated with 2,2-bis(chloromethyl)-1,3-propanediol cyclic sulfite, which acts as a bird management agent. Birds that have eaten even a very small amount of his "bird management" agent are unable to fly for some time and/or undergo convulsions, emit warning or distress cries to other birds and the like. It is not known definitely by what mechanism these warning cries or convulsive actions serve to drive other birds away from affected birds but, as shown by the specific examples hereinbelow, the compound of the invention is effective for clearing birds from an area after at least one of the birds has been subjected to the action of the compound of the invention.

Ingestion of a sufficient amount of this compound of the invention defined above by one or more birds produces symptoms such as tremors, loss of flight, fluttering, paralysis, and warning and distress cries. The result is that other birds, upon seeing birds having convulsions or suffering from paralysis, and hearing the distress cries emitted by affected birds, even entire flocks of birds, will leave an area and stay away from the area for long periods of time.

When employing the bird management or anti-flying compound of this invention to reduce the number of birds in an area, one or more of the birds in the area to be cleared must ingest an effective amount of the compound. The active compound can be ingested by the birds by feeding the birds treated food or other ingestible material, or by injecting a small amount of the compound into at least one of the birds' bodies by suitable means. The amount of effective compound ingested by a bird to get the desired effect is generally within the range of 3 to 500 mg. of the active ingredient per kg. of bird weight, usually in the range of 5 to 100 mg./kg. Since one wishing to clear an area of birds by the method of this invention has only limited control over the amount of treated food that a bird will eat, it is difficult to specify exactly what dose will be applied to birds under actual conditions; this can be done to some extent by varying the amount of treated food put out, however. One method which can be used for selecting between species of birds is the use of different sized grain. For example, sparrows cannot eat whole kernel corn whereas pigeons can eat such food very readily. Thus, if one wishes to clear pigeons from a building or other area where only small populations of sparrows exist, whole corn can be used exclusively. It is apparent that mixtures of the compound of the instant invention and other known bird management agents can be used either on a similar carrier or on different carriers.

Birds can be made to ingest the bird management agent of this invention by application of a suitable amount of the active agent to a material ingested by the species of birds to be treated. For instance, the active bird management agent can be mixed with water, feed grain, mixed compositions as disclosed in U.S. 3,193,455, bread, grit, fruits, or other materials likely to be ingested by the target species of bird. Treatment of the bait can be by any method known to the art. For instance, the material can be applied as an emulsion, in water, as a mixture with various diluents such as hydrocarbons, fatty materials, lecithin, and the like, or as a mixture with volatile solvents such as acetone, methyl ethyl ketone, or the like. Various materials can be used as formulation aids. For example, methylcellulose, gelatin, lecithin, mineral oil, or the like can be employed. The active material can be applied as a surface coating, impregnated into the bait material, dusted onto the surface in the form of a suitable formulation, or applied to the bait by any other means known to the art.

Normally, the material to be ingested by the bird (the bait) should comprise in the range of 0.001 to 30, preferably 0.02 to 2, weight percent of 2,2-bis(chloromethyl)-1,3-propanediol cyclic sulfite. The bait material that contains the active flock dispersing agent of the instant invention can be employed to treat nuisance and depredatory birds by any means known to the art. For example, a limited amount of treated material can be admixed with larger amounts of untreated bait, a limited amount of the treated bait can be put out, feeders can be used, standing grain can be treated in suitable areas known to suffer heaviest bird depredations, crop species known to be especially palatable to birds can be subsequently treated when such species are planted as guard rows for the crop to be protected, or other techniques of application well known to those skilled in the art can be employed.

The active agent of this invention, 2,2-bis(chloromethyl)-1,3-propanediol cyclic sulfite, can be prepared by any means known to the art. For instance, pentaerythritol can be treated with thionyl chloride in the presence of pyridine to give 2,2-bis(chloromethyl)-1,3-propanediol cyclic sulfite as disclosed by Shostakoveskii, Chemical Abstracts 63, 7002 (1965), by U.S. 2,844,592, and the like.

In actual operation, birds can be effectively cleared from an area, building, or other locality, with a very minor amount of the above-described compound. By employing small amounts of treated grain, for example, one need not treat the entire area such as would be required if a true repellent material were employed. By operating in this manner, buildings, airport runways, grain fields, and the like, can be cleared of birds and maintained clear of birds for prolonged periods of time. This is particularly advantageous in grain fields since farmers can place small amounts of treated grain in the fields shortly before the grain ripens, thus clearing the birds from the fields, before they have a chance to eat the crop. After the crop has been harvested, the use of treated bait or bird food can be discontinued. In some instances, it is desirable to first lure the birds into an area with a bait or untreated grain, and then place treated bird food in the area for the birds to consume with the result that affected birds warn and scare other birds away from that particular area.

The composition and process of the instant invention can be employed to control a wide variety of birds that are usually or occasionally classed as nuisance or depredatory (pest) birds. For example, feral pigeons, sparrows, starlings, redwing blackbirds, cowbirds, crows, grackels, Quelea birds, and the like are species that are depredatory on occasion. A number of other species such as gulls, horned larks, and the like are occasionally troublesome and can be controlled through the use of the compound of this invention.

The operability of the instant invention is demonstrated by the following examples.

EXAMPLE I

A bait mixture was prepared by impregnating 1 part by weight of 2,2-bis(chloromethyl)-1,3-propanediol cyclic sulfite into each of 99 parts by weight red milo and 99 parts by weight fine corn chops. Impregnation was effected by tumbling the respective grain materials in a mixture comprised of sufficient 2,2-bis(chloromethyl)-1,3-propanediol cyclic sulfite admixed with water to effect the 1 weight percent concentration of 2,2-bis(chloromethyl)-1,3-propanediol cyclic sulfite desired on the final grain mixtures, and to take up all free liquid in both cases. Upon drying the treated milo and corn chops were admixed in a one to one ratio and employed in the following field test.

A feed store was plagued with about 75 sparrows, as determined by field observation. The sparrows were prebaited at locations which they were known to frequent for two days with a mixture of untreated milo and corn chops. On the third day, the untreated grain mixture was replaced with a mixture comprised of the above treated milo and corn chops mixture and untreated milo and corn chops mixture of similar proportions in a 1:1 ratio (by weight). The feed store and surrounding area were observed for the next few days. Within the next three hours, a total of 7 sparrows were observed to be demonstrating the actions induced by 2,2-bis(chloromethyl)-1,3-propanediol cyclic sulfite in the general area of the feed store, and an exodus of other sparrows from the area was noted. Small flocks were noted to return to the feed store in diminishing numbers for the next few days. Even after a time lapse of 14 days during which time the bait was damaged by rain the maximum number of birds using the area was only 25 to 30.

The above example demonstrates that 2,2-bis(chloromethyl)-1,3-propanediol cyclic sulfite is an effective bird management agent.

The 2,2-bis(chloromethyl)-1,3-propanediol cyclic sulfite employed in the above example was prepared by the following method: To a stirred reactor were charged 408 g. (3 mole) pentaerythritol and 80 ml. (0.1 mole) of pyridine. Thionyl chloride (1180 g., 10 mole) was then added dropwise. Temperature was maintained in the range of 50–60° C. The reaction was allowed to equilibrate, and 1 liter of $H_2O$ was added. An organic layer was washed with water, dried, and stripped to yield 680 g. of crude product. This product was fractionally distilled under vacuum to yield 450 g. of purified product (B.P.~90° C., at 0.4 mm. Hg, $N_D^{20}$~1,5072)

EXAMPLE II

An emulsion comprised of 0.1 wt. percent of 2,2-bis(chloromethyl)-1,3-propanediol cyclic sulfite in water was prepared employing a minimum amount of Triton X-100 (trademark) emulsifier. The 0.1 percent emulsion was orally entubed to starlings. Data are presented by the following table; each run refers to a single bird.

TABLE I

| Run No. | Dose, Mg./kg.[1] | Reaction | Death |
|---|---|---|---|
| 1 | 5 | None | No. |
| 2 | 10 | Distress calls and other flock alarming reactions very similar to those produced by 4-aminopyridine, a known commercial bird management material | Yes. |
| 3 | 10 | ⎯⎯do⎯⎯ | No. |
| 4 | 15 | ⎯⎯do⎯⎯ | Yes. |

[1] "Mg./Kg." is mg. of 2,2-bis(chloromethyl)-1,3-propanediol cyclic sulfite per kg. of body weight of the starling.

This example demonstrates that 2,2-bis(chloromethyl)-1,3-propanediol cyclic sulfite is an effective material for producing actions of starlings of a type that are known to cause dispersion of birds from a locus.

EXAMPLE III

Corn chops that had been treated with 2,2-bis(chloromethyl)-1,3-propanediol cyclic sulfite were force fed to cowbirds and pigeons to effect the dosage levels noted below. Data follow in Table II.

TABLE II

| Run No. | Species | Dose, Mg./kg.[1] | Reaction | Death |
|---|---|---|---|---|
| 5 | Cowbird | 10 | Convulsions, distress calls, etc. of a type characterized by 4-aminopyridine, a known commercial bird management material. | Yes. |
| 6 | do | 10 | do | No. |
| 7 | Pigeon | 20 | do | Yes. |
| 8 | do | 10 | do | No. |

[1] Mg./kg. refers to mg. of 2,2-bis(chloromethyl)-1,3-propanediol cyclic sulfite, per kg. of body weight of the bird.

This example demonstrates that 2,2-bis(chloromethyl)-1,3-propanediol cyclic sulfite, when applied to a grain to produce a treated bait, effectively produces symptoms in sparrows and cowbirds of a type that are produced by 4-aminopyridine, the active ingredient in a commercial bird management material. These symptoms, characterized as distress calls, fluttering, convulsions, and the like, are well known to disperse birds from a locus.

While this invention has been described in detail for the purpose of illustration, it is not to be construed as limited thereby but is intended to cover all changes and modifications within the spirit and scope thereof.

We claim:

1. A method for reducing the number of birds at the locus which comprises applying to said locus a composition comprising an ingestible carrier selected from the group consisting of water, feed grain, bread, grit, and fruits, containing 0.001 to 30 weight percent 2,2-bis(chloromethyl)-1,3-propanediol cyclic sulfite, and causing said birds to eat said composition until at least one of said birds has injected an amount of said cyclic sulfite equal to between 5 and 100 milligrams per kilogram of bird weight.

2. A method according to claim 1 wherein said carrier contains 0.02 to 2 weight percent of said 2,2-bis(chloromethyl)-1,3-propanediol cyclic sulfite.

3. A method according to claim 2 wherein said carrier is a feed grain and said birds comprise sparrows.

4. A method for reducing the number of like birds in an area which comprises causing at least one of said birds to ingest an effective distress producing amount of 2,2-bis(chloromethyl)-1,3-propanediol cyclic sulfite.

5. A method according to claim 4 wherein said amount of said 2,2-bis(chloromethyl)-1,3-propanediol cyclic sulfite ingested is within the range of 3 to 500 mg./kg. of bird weight.

6. A method according to claim 4 wherein said amount of said 2,2-bis(chloromethyl)-1,3-propanediol cyclic sulfite ingested is within the range of 5 to 100 mg./kg. of bird weight.

7. A method according to claim 4 wherein said birds comprise sparrows.

8. A bird management composition comprising an ingestible carrier comprising feed grain containing from 0.001 to 30 weight percent of 2,2-bis(chloromethyl)-1,3-propanediol cyclic sulfite based on the weight of said carrier.

9. A composition according to claim 8 wherein said 2,2 - bis(chloromethyl)-1,3-propanediol cyclic sulfite is present in an amount within the range of 0.2 to 2 weight percent, based on the weight of said carrier.

References Cited

UNITED STATES PATENTS 2,844,592   7/1958   Pietsch et al. _____ 260—333

ALBERT T. MEYERS, Primary Examiner

F. E. WADDELL, Assistant Examiner